US012659886B2

(12) United States Patent
Nuttall et al.

(10) Patent No.: US 12,659,886 B2
(45) Date of Patent: Jun. 16, 2026

(54) DYNAMIC POWER ASSIGNMENT BASED ON LINK QUALITIES AND TOTAL INTEGRATED TRANSMISSION POWER

(71) Applicant: Skylo Technologies, Inc., Mountain View, CA (US)

(72) Inventors: Andrew Nuttall, Mountain View, CA (US); Soham Dhiren Desai, Palo Alto, CA (US); Yihenew Dagne Beyene, Espoo (FI); Meghna Agrawal, Cupertino, CA (US)

(73) Assignee: Skylo Technologies, Inc., Mountain View, CA (US)

( * ) Notice: Subject to any disclaimer, the term of this patent is extended or adjusted under 35 U.S.C. 154(b) by 275 days.

(21) Appl. No.: 18/668,402

(22) Filed: May 20, 2024

(65) Prior Publication Data

US 2025/0324370 A1 Oct. 16, 2025

Related U.S. Application Data

(60) Provisional application No. 63/634,496, filed on Apr. 16, 2024.

(51) Int. Cl.
*H04W 52/36* (2009.01)
*H04W 52/24* (2009.01)
*H04W 52/32* (2009.01)

(52) U.S. Cl.
CPC ....... *H04W 52/367* (2013.01); *H04W 52/241* (2013.01); *H04W 52/325* (2013.01)

(58) Field of Classification Search
CPC ............. H04W 52/367; H04W 52/241; H04W 52/325; H04W 52/143
See application file for complete search history.

(56) References Cited

U.S. PATENT DOCUMENTS 10,425,865 B2 9/2019 Damnjanovic et al.
11,576,168 B2 2/2023 Xu et al.
(Continued)

OTHER PUBLICATIONS

Optimal Pilot Symbol Power Allocation in LTE, Michal Simko, Stefan Pendl, Stefan Schwarz, Qi Wang, Josep Colom Ikuno, Markus Rupp; Institute of Telecommunications, Vienna University of Technology Gusshausstrasse 25/389, A-1040 Vienna, Austria; IEEE 2011, Published in the proceedings of VTC—Fall 2011.

(Continued)

*Primary Examiner* — Md K Talukder
(74) *Attorney, Agent, or Firm* — Brian R. Short

(57) ABSTRACT

Apparatuses, methods, and systems of dynamic power assignment based on link qualities and total integrated transmission power are disclosed. One method includes determining the total integrated transmission power of a base station, wherein the total integrated transmission power is integrated over time and frequency, and wherein the total integrated transmission power is dependent on an available amount of power of a satellite linked to the base station, transmitting reference signals, wherein the reference signals are transmitted at a higher power level than data signals, receiving link quality characterization information from a plurality of wireless devices based on reception of the reference signals by the plurality of wireless devices through the satellite, and assigning a transmission power associated with each of the plurality of wireless devices based upon the received link quality characterization information and the total integrated transmission power over the threshold period of time.

20 Claims, 12 Drawing Sheets

(56)                         References Cited

U.S. PATENT DOCUMENTS

| | | | |
|---|---|---|---|
| 12,432,663 B2 * | 9/2025 | Sayenko ............. | H04W 52/146 |
| 2003/0083089 A1 * | 5/2003 | Malladi .............. | H04B 7/18543 |
| | | | 455/522 |
| 2017/0142665 A1 * | 5/2017 | Tabet .................. | H04W 72/542 |
| 2018/0206196 A1 * | 7/2018 | Wang .................. | H04W 52/343 |
| 2022/0038057 A1 * | 2/2022 | Gutman ............... | H04B 17/354 |
| 2023/0319822 A1 | 10/2023 | Park et al. | |
| 2023/0396327 A1 | 12/2023 | Mendelsohn et al. | |
| 2023/0397123 A1 * | 12/2023 | Lou ..................... | H04W 52/346 |
| 2024/0430817 A1 * | 12/2024 | Vempati ............. | H04W 52/281 |
| 2025/0016689 A1 * | 1/2025 | Li .......................... | H04L 5/0051 |
| 2025/0324370 A1 * | 10/2025 | Nuttall ................ | H04W 52/367 |

OTHER PUBLICATIONS

Are Pilots and Data Transmitted With the Same Power ?; Emil
Björnson; 5G, Commentary, Technical Insights; Oct. 2, 2018;
Wireless Future.

* cited by examiner

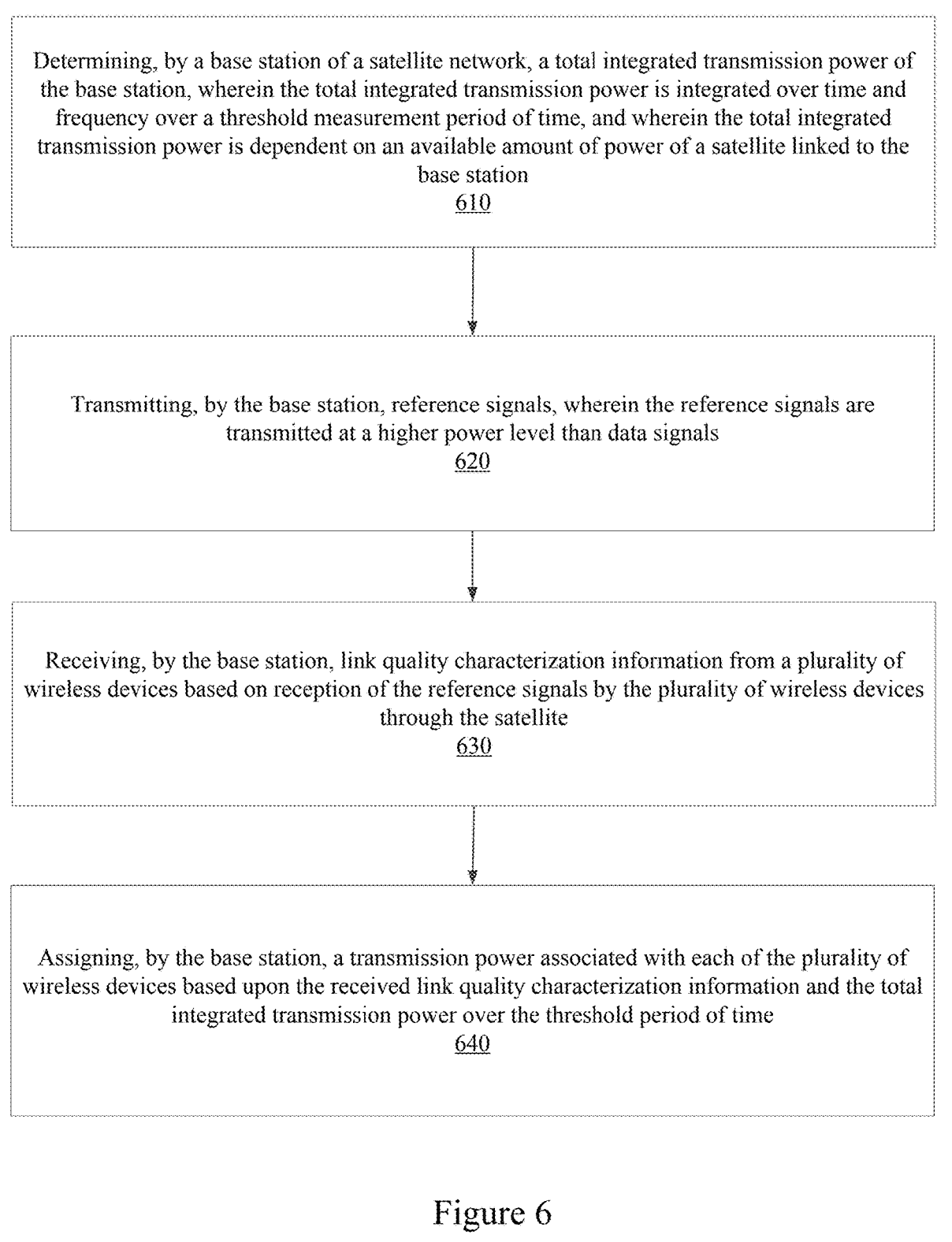

Determining, by a base station of a satellite network, a total integrated transmission power of the base station, wherein the total integrated transmission power is integrated over time and frequency over a threshold measurement period of time, and wherein the total integrated transmission power is dependent on an available amount of power of a satellite linked to the base station
610

Transmitting, by the base station, reference signals, wherein the reference signals are transmitted at a higher power level than data signals
620

Receiving, by the base station, link quality characterization information from a plurality of wireless devices based on reception of the reference signals by the plurality of wireless devices through the satellite
630

Assigning, by the base station, a transmission power associated with each of the plurality of wireless devices based upon the received link quality characterization information and the total integrated transmission power over the threshold period of time
640

Figure 6

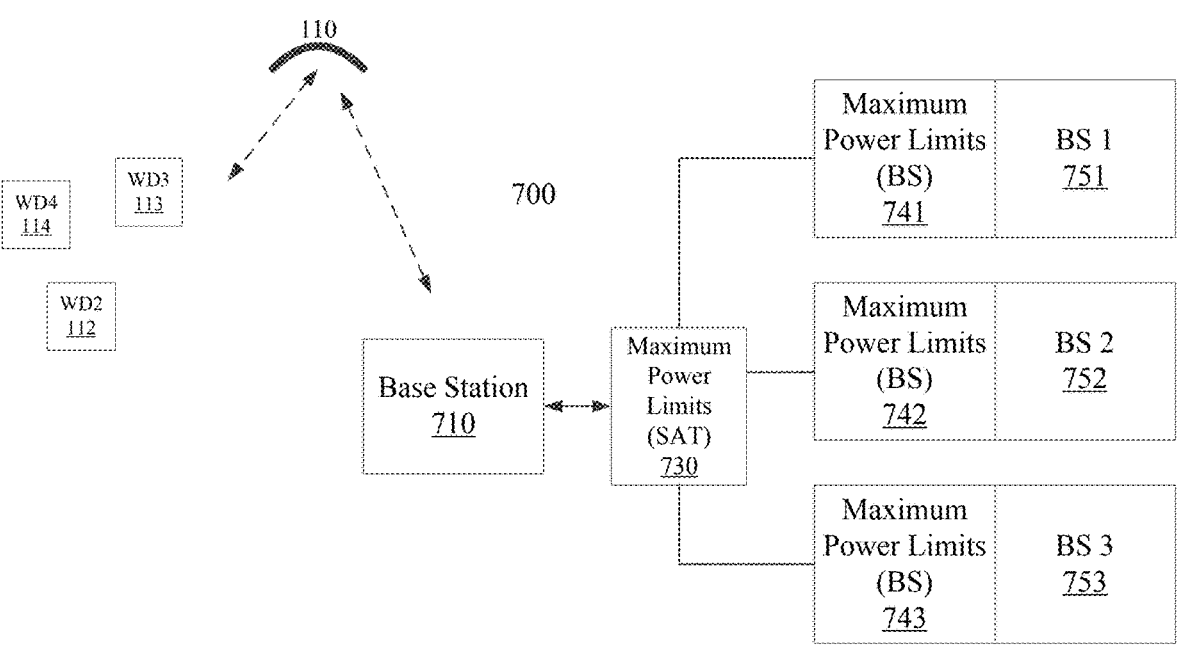
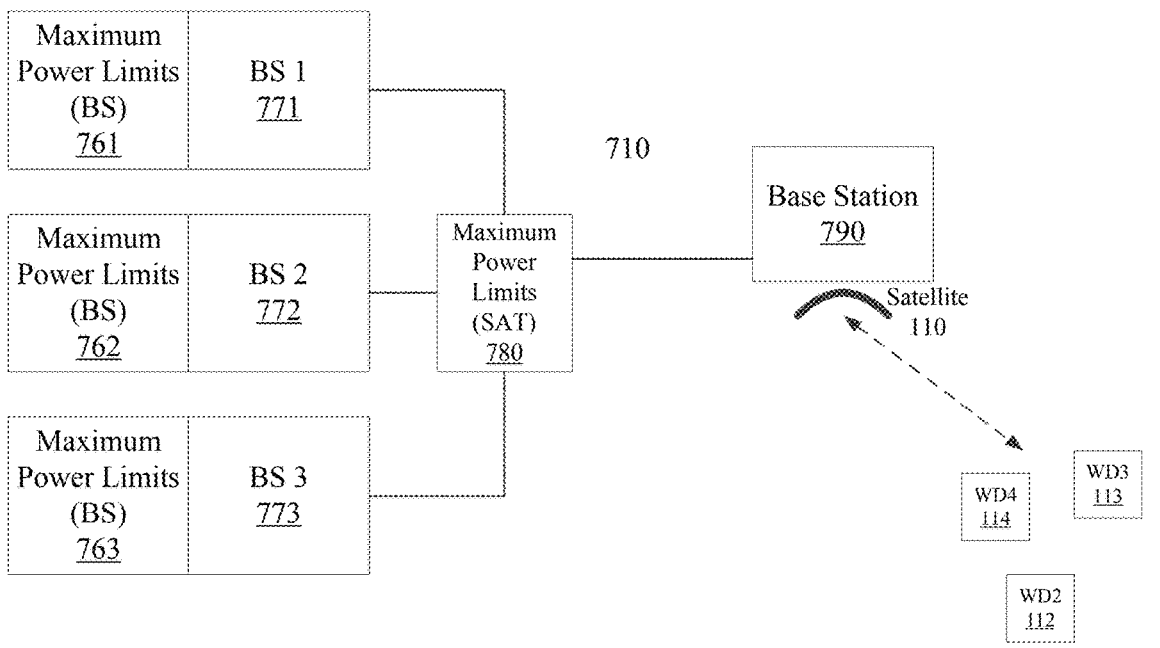
Figure 7

DYNAMIC POWER ASSIGNMENT BASED ON LINK QUALITIES AND TOTAL INTEGRATED TRANSMISSION POWER

RELATED PATENT APPLICATION

This patent application claims priority to Provisional Patent Application Ser. No. 63/634,496 filed Apr. 16, 2024, which is herein incorporated by reference.

FIELD OF THE DESCRIBED EMBODIMENTS

The described embodiments relate generally to wireless communications. More particularly, the described embodiments relate to systems, methods, and apparatuses for a dynamic power assignment based on link qualities and total integrated transmission power.

BACKGROUND

Satellite networks operate to cover large areas and can have a large number of users. Further, only limited amounts of spectral resources are allocated to satellite networks. Accordingly, a satellite network should manage connectivity of wireless devices to the satellite network.

It is desirable to have methods, apparatuses, and systems for a dynamic power assignment based on link qualities and total integrated transmission power.

SUMMARY

An embodiment includes a method of dynamic power assignment based on link qualities and total integrated transmission power. The method includes determining, by a base station of a satellite network, the total integrated transmission power of the base station, wherein the total integrated transmission power is integrated over time and frequency over a threshold measurement period of time, and wherein the total integrated transmission power is dependent on an available amount of power of a satellite linked to the base station, transmitting, by the base station, reference signals, wherein the reference signals are transmitted at a higher power level than data signals, receiving, by the base station, link quality characterization information from a plurality of wireless devices based on reception of the reference signals by the plurality of wireless devices through the satellite, and assigning, by the base station, a transmission power associated with each of the plurality of wireless devices based upon the received link quality characterization information and the total integrated transmission power over the threshold period of time.

Another embodiment includes a satellite system base station. For an embodiment, the satellite system base station is configured to determine a total integrated transmission power of the satellite base station, wherein the total integrated transmission power is integrated over time and frequency over a threshold measurement period of time, and wherein the total integrated transmission power is dependent on an available amount of power of a satellite linked to the satellite base station, transmit reference signals, wherein the reference signals are transmitted at a higher power level than data signals, receive link quality characterization information from a plurality of wireless devices based on reception of the reference signals by the plurality of wireless devices through the satellite, and assigning a transmission power associated with each of the plurality of wireless devices based upon the received link quality characterization information and the total integrated transmission power over the threshold period of time.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes steps of a method of dynamic power assignment based on link qualities and total integrated transmission power.

FIG. 7 shows two satellite/base station architectures and management of transmission power limits, according to an embodiment.

DETAILED DESCRIPTION

The embodiments described include methods, apparatuses, and systems for a dynamic power assignment based on link qualities and total integrated transmission power.

Figure 1:
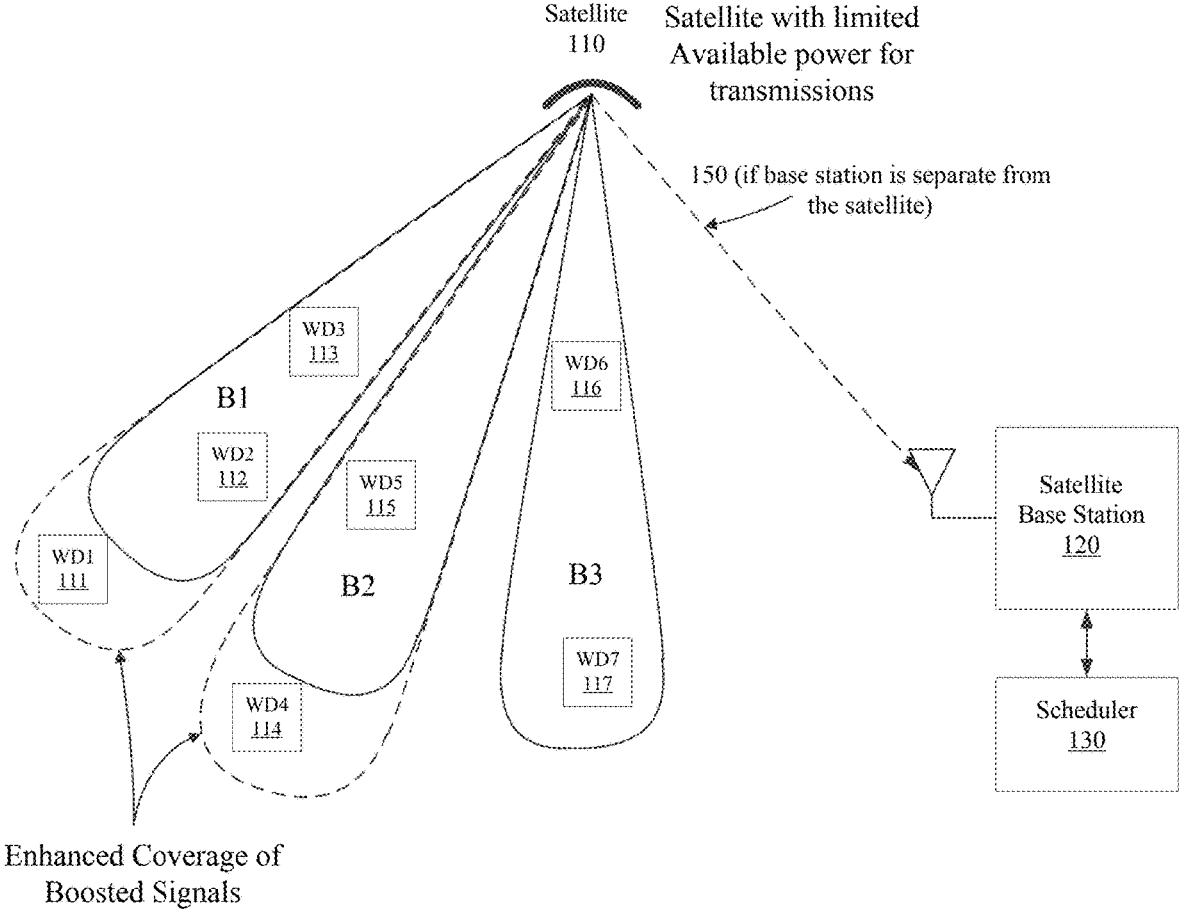
FIG. 1 shows a satellite network that includes a base station that transmits reference signals at a higher power level than data signals and assigns resources to wireless devices based on link qualities and a total integrated transmission power of the base station, according to an embodiment.

FIG. 1 shows a satellite network that includes a base station 120 that transmits reference signals at a higher power level than data signals and assigns resources to wireless devices 111-117 based on link qualities and a total integrated transmission power of the base station 120, according to an embodiment. FIG. 1 shows a wireless link 150 between a satellite 110 and the base station 120. However, for an embodiment, the base station 120 and the satellite 110 are a single unit. For an embodiment, the base station 120, other base stations, and the satellite 110 are a single unit.

As shown, the satellite 110 forms beams that provide coverage through, for example, beams B1, B2, B3, for the wireless devices 111-117. Further, FIG. 1 shows an enhanced (larger) coverage area enabled by boosting (increasing) the transmission power of certain signals transmitted from the satellite.

For an embodiment, the base station 120 is configured to determine a total integrated transmission power of the base station 120, wherein the total integrated transmission power is integrated over time and frequency over a threshold measurement period of time, and wherein the total integrated transmission power is dependent on an available amount of power of the satellite 110 linked to the base station 120. For an embodiment, the satellite 110 provides a fixed gain of wireless communication from the base station 120 to the wireless devices. Accordingly, the power of transmission signals from the satellite 110 is determined by the power level of transmission signals from the base station. For an embodiment, the satellite 110 is located in space and has a finite amount of available power. The satellite 110 may be powered by solar, but again, the amount of power available for signal transmission may be limited. Accordingly, the power available to the satellite can influence the value of the total integrated transmission power.

For an embodiment, the total integrated transmission power (per base station) is defined as the total radiated power (EIRP) for all transmission by a base station over a threshold measurement period of time. For an embodiment, the threshold measurement period of time is a unit for allocation of power budgets to a base station, wherein the base station has maximum average and maximum instantaneous power limits. For an embodiment, the threshold measurement period of time depends on the satellite and an earth station, wherein the earth station is located on earth. For an embodiment, the maximum average power is referred to as "maximum total integrated power", and the maximum instantaneous power is referred to as "maximum total integrated power" per base station.

For an embodiment, the base station 120 is further configured to transmit reference signals, wherein the reference signals are transmitted at a higher power level (boosted) than data signals. For an embodiment, the reference signals include training signals (pilot signals) that have known characteristics, thereby allowing each wireless device 111-117 that receives the reference signals to characterize a wireless link (link quality characterization information) between the satellite 110 and the wireless device.

For an embodiment, the base station 120 is further configured to receive the link quality characterization information from the plurality of wireless devices 111-117 based on reception of the reference signals by the plurality of wireless devices 111-117 through the satellite 110. For an embodiment, the received pilot signals of the reference signals are used by the wireless devices 111-117 to estimate RSRP (received signal received power) and RSRQ (reference signal received quality) levels of wireless signals received by the wireless devices 111-117 from the satellite 110. For an embodiment, the RSRP and RSRQ levels are used by wireless devices 111-117 to calculate their cell selection minimum signal level quality. Pilot signals with a higher power level allow wireless devices which were previously not meeting the minimum signal quality to attempt to connect to the base station 120.

For an embodiment, the base station 120 is further configured to assign a transmission power associated with each of the plurality of wireless devices based upon the received link quality characterization information and the total integrated transmission power over the threshold period of time. For an embodiment, assigning the transmission power associated with each of the plurality of wireless devices includes assigning a default transmission power level to wireless devices having received link quality characterization information indicating a link quality better than a selected quality threshold, and assigning a boosted transmission power level to wireless devices having received link quality characterization information indicating a link quality worse than the selected quality threshold. For an embodiment, the selected link quality threshold is adaptive. For an embodiment, the selected link quality threshold is selected based on the overall demand/number of wireless devices, utilization, number of wireless devices with high service needs and low signal quality, and/or an overall power budget allocated by the satellite.

For an embodiment, the assigning further includes assigning a Modulation and Coding Scheme (MCS) and Repetitions (repeated transmissions) for each of the wireless devices based on the received link quality characterization information and the calculated total integrated transmission power over the threshold period of time.

For an embodiment, the assigning includes generating a time/frequency schedule of slots of a schedule, wherein different wireless devices are assigned different slots which designate that wireless devices having poor link quality characterization information are assigned a boosted power or signal amplitude. For an embodiment, a scheduler 130 associated with the base station 120 performs the scheduling. For an embodiment, assigning the boosted power is additionally dependent on the available amount of power of a satellite. For an embodiment, the boosted power may be limited, or enhanced by an amount of available power. The amount of power available may be directed to the number of wireless devices being assigned or allocated the boosted power, and/or to an amount of power allocated to the boosting. For an embodiment, the total power of all of the wireless devices over the threshold period of time is less than or equal to the total integrated transmission power or the available amount of power of the satellite.

As described, at least some embodiment further includes a wireless device requesting to transmit signals across the satellite network based upon the estimated link quality characterization information. For an embodiment, according to the 3GPP (3rd Generation Partnership Project) specifications the wireless device needs to check the minimum signal quality requirements from the base station (cell selection criteria) before trying to do a connection attempt on the particular cell. The wireless devices will only perform a connection attempt on the cell if these minimum quality requirements are met. For an embodiment, this minimum signal quality measurement on the wireless device is based on the reference signal(s). Since the reference signal power is boosted, some wireless devices are now eligible to do a connection attempt on the cell that would not have been eligible without the power boosting of the reference signals.

For an embodiment, the base station 120 adjusts the transmission power by adjusting a modulation constellation amplitude.

For an embodiment, the base station 120 is configured to adjust the transmission power during a threshold period of time to ensure the total integrated transmission power is less than a threshold amount. For an embodiment, each base station of the satellite network has a power budget allocated by an integrated power manager (SAT), for a fixed duration of time. For an embodiment, the base station 120 is free to increase the data channel power for wireless devices as long as the total integrated transmission power of the base station 120 does not exceed the power budget allocated to the base station 120.

For an embodiment, the base station 120 is configured to assign higher transmission power for the transmissions associated with the wireless device when the received link quality characterization information indicates a wireless link quality below a link quality threshold. For an embodiment, the link quality threshold is adaptive. For an embodiment, the link quality threshold is selected based on the overall demand/number of wireless devices, utilization, number of wireless devices with high service needs and low signal quality, and/or an overall power budget allocated by the satellite.

For an embodiment, the base station 120 is configured to assign a higher transmission power for the transmissions associated with the wireless device when the total integrated transmission power of the base station over a threshold period of time is less than a threshold value. For an embodiment, the base station can effectively increase the transmission power for wireless devices with higher signal quality as well if the base station has the power budget to do so, which can provide higher data rates and/or lower latency.

For an embodiment, the base station 120 is configured to assign higher transmission power for the transmissions associated with the wireless device when throughput requirements of a wireless device require a specific modulation and encoding scheme to be used. For example, voice services may require minimum throughput for initiating a session. Therefore, a higher power is assigned to the wireless device to support the voice sessions when link quality of the wireless is poor. Similarly, higher power can be allocated for emergency services for faster response and higher reliability.

For an embodiment, the base station 120 is configured to dynamically assign a receive gain amplitude for the transmissions associated with a wireless device based on the received link quality characterization information. That is, for an embodiment, the base station 120 further dynamically assigns a higher receive gain power for the transmissions associated with the wireless device with low link quality (below the selected threshold). For example, the dynamically assigned receive gain amplitude may include increasing the receiving gain for particular subcarriers transmitted to the wireless device.

For an embodiment, the base station 120 is configured to receive quality of service requirements for transmissions associated with a wireless device and further assign a transmission power based on quality-of-service requirements. For example, if the wireless device has voice data traffic for transmission, a high data rate may be required, and therefore, and may have a minimum MCS (modulation and coding scheme) requirement. For an embodiment, wireless devices that request voice data need to ensure they are able to sustain a minimum MCS so a higher transmission power for these wireless devices may be needed.

Figure 9:
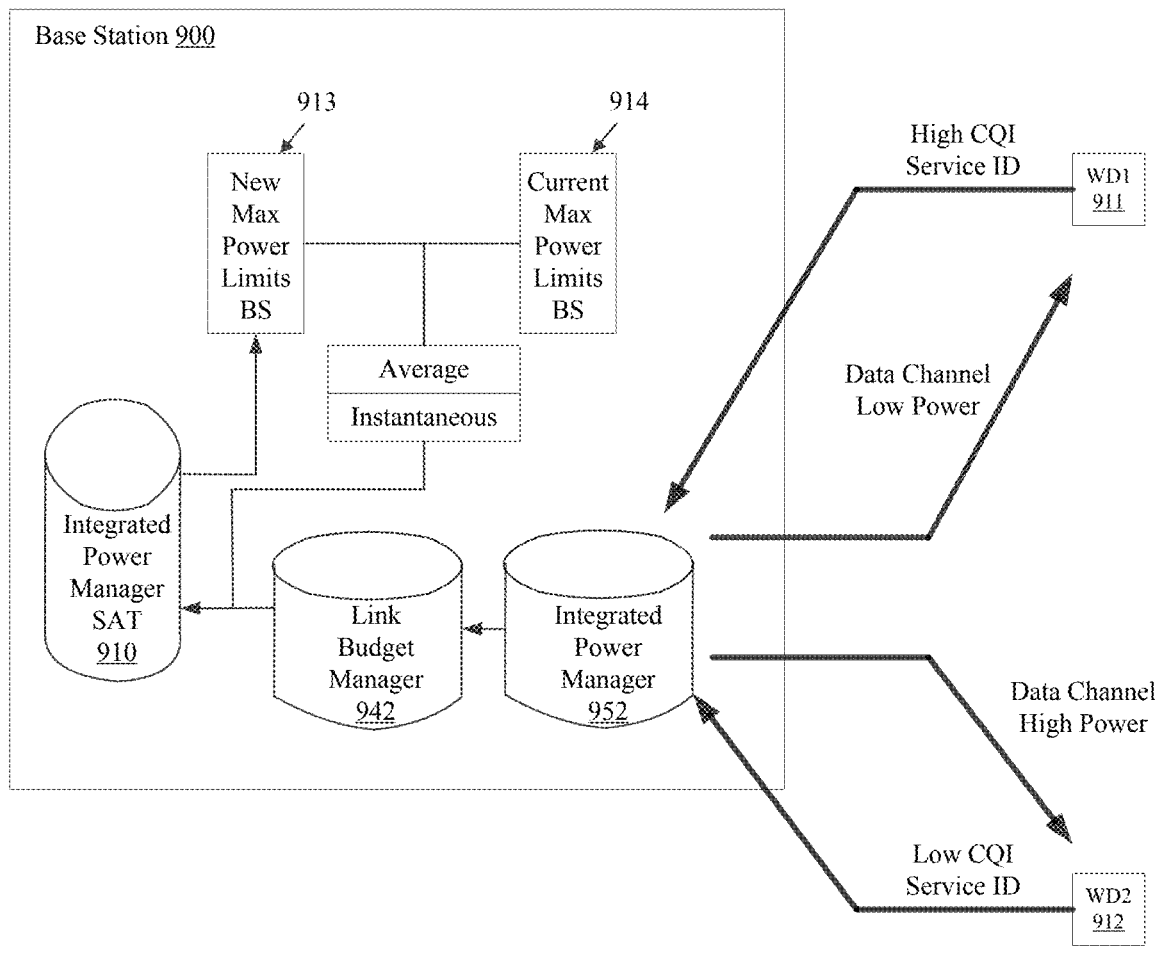
FIG. 9 shows management of a distribution of integrated transmission power of a base station, according to an embodiment.

For an embodiment, the base station 120 is configured to collectively receive the link quality characterization information from the plurality of wireless devices and adjust transmission power for all transmissions based upon the collective link quality information. As will be described in relation to FIG. 9, for an embodiment, the base station 120 has a maximum power limit (budget) allocation. For an embodiment, the base station collects link quality information from multiple wireless devices, and also the base station collects the service IDs to determine the maximum number of devices that can be assigned or allocated a power boost. As depicted in FIG. 9, the base station power boosts and increases the transmission power for the data channel power for the wireless device 1 but must reduce the data channel power for wireless device 2. For an embodiment, the service IDs are services which are requested by the wireless device. For example, voice may have a service ID 1 and SMS may have a service ID2. Depending on the service ID, the MCS requirement can be different, and therefore, the link requirements change, so base station might need to increase transmission power to support some service IDs.

For an embodiment, the change in transmission power for a wireless device is based upon the transmission power level of the reference signals. For an embodiment, the change in transmission power of reference (pilot) signals with a boost, increases the overall power transmission by a beam of the satellite only marginally. For example, a 3 dB boost in reference signal power will increase the integrated power transmitted by the base station by only 0.3 dB. As described, the boost of 3 dB to the reference signal allows for wireless devices to cross the minimum cell quality threshold levels to meet the cell selection criteria. For an embodiment, the pilot signal power level is 3 dB (or some other selected amount) higher than the data signals. For an embodiment, the devices which need power boost can get the same 3 dB or even a higher power boost for data transmission (depending upon the power budget available).

An embodiment includes an integrated power manager (SAT) configured to monitor total integrated power levels across all base stations linked to the satellite, ensuring that a total satellite power does not exceed a maximum average power and an instantaneous power limit. For an embodiment, the power being utilized by each base station is reported by the base stations to the Integrated Power Manager (SAT).

An embodiment includes the integrated power manager (SAT) configured to monitor total integrated power levels across all base stations linked to the satellite and allocate extra power to one or more of the base stations based on network load and power requirements of the one or more base stations. For an embodiment, the extra power is as requested by an integrated power manager of one or more base stations.

For an embodiment, the integrated power manager (SAT) is configured to calculate a rolling average of the power usage across multiple transmission multiple channels linked to the satellite. For an embodiment, the rolling average of the power usage is reported by each of the base stations. Further, for an embodiment, the integrated power manager (SAT) is configured to dynamically adjust the power level of at least one of the transmission channels of the base station, based on the calculated rolling average. Further, for an embodiment, the integrated power manager (SAT) is configured to assign a higher power level to a specific transmission channel as required by a specific application need, while ensuring that the combined power usage across all channels does not exceed a predetermined threshold.

For an embodiment, the assignment of the higher power level is contingent upon maintaining the rolling average of power usage across the multiple channels below a predefined limit. For an embodiment, the base station and the integrated power manager (SAT) allocate and maintain power for an integer multiple of threshold measurement period of time.

Figure 2:
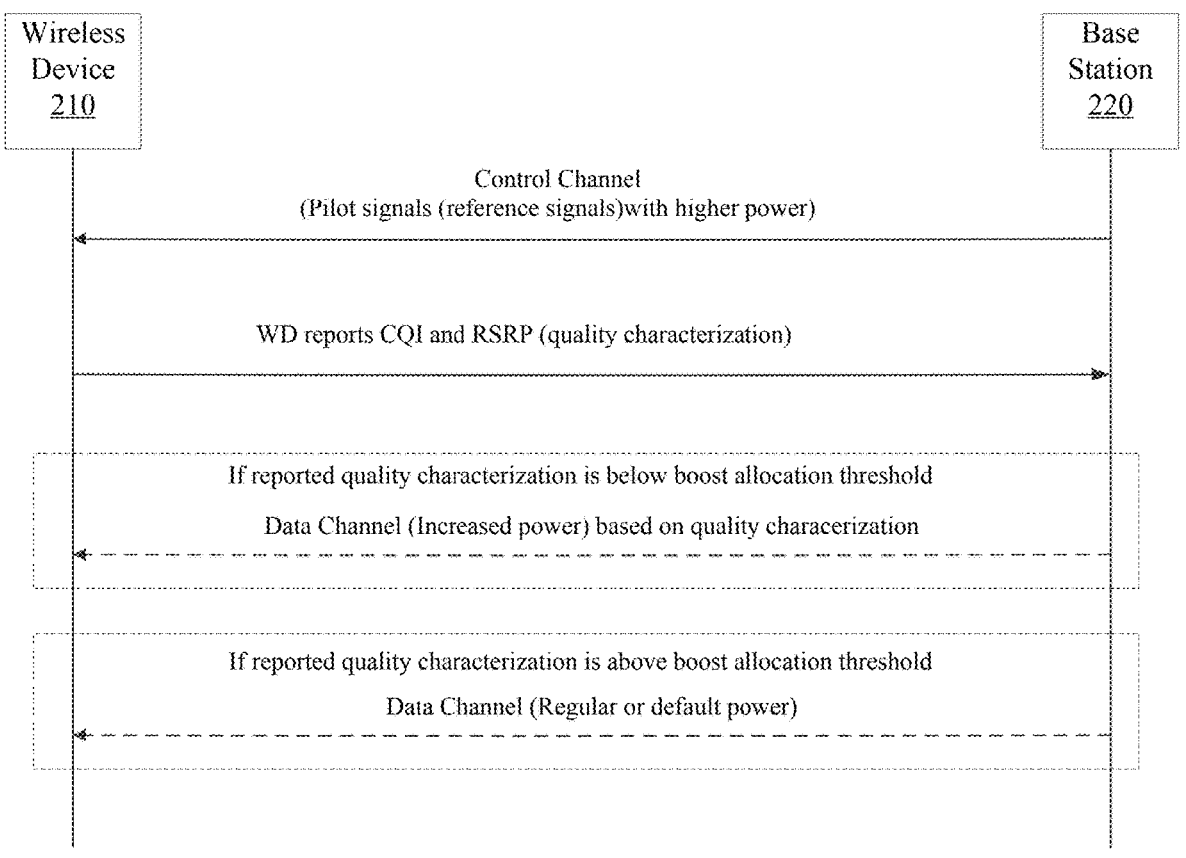
FIG. 2 shows the timing of wireless communication between a base station and a wireless device, according to an embodiment.

FIG. 2 shows the timing of wireless communication between a base station and a wireless device, according to an embodiment. As shown, a base station 220 transmits a control channel to a wireless device 210. For an embodiment, the control channel includes pilot signals or reference signals that are transmitted at a higher power (boosted) relative to a default power level of data signals. The wireless device 210 receives the pilot signals and characterizes the wireless link between a satellite and the base station 210. For an embodiment, the wireless device then reports link quality characterization information that includes information of the characterized wireless link, including, for example, a CQI (channel quality information) or RSRP (received signal received power). Based on the reported link quality characterization information the base station 220 transmits at least some data channels at an increased or boosted signal level based on wireless devices having low-quality links (less than a threshold quality). For an embodiment, data channels (data signals) corresponding to wireless devices that have link qualities higher than the threshold quality are transmitted from the base station at a default power level.

Figure 3:
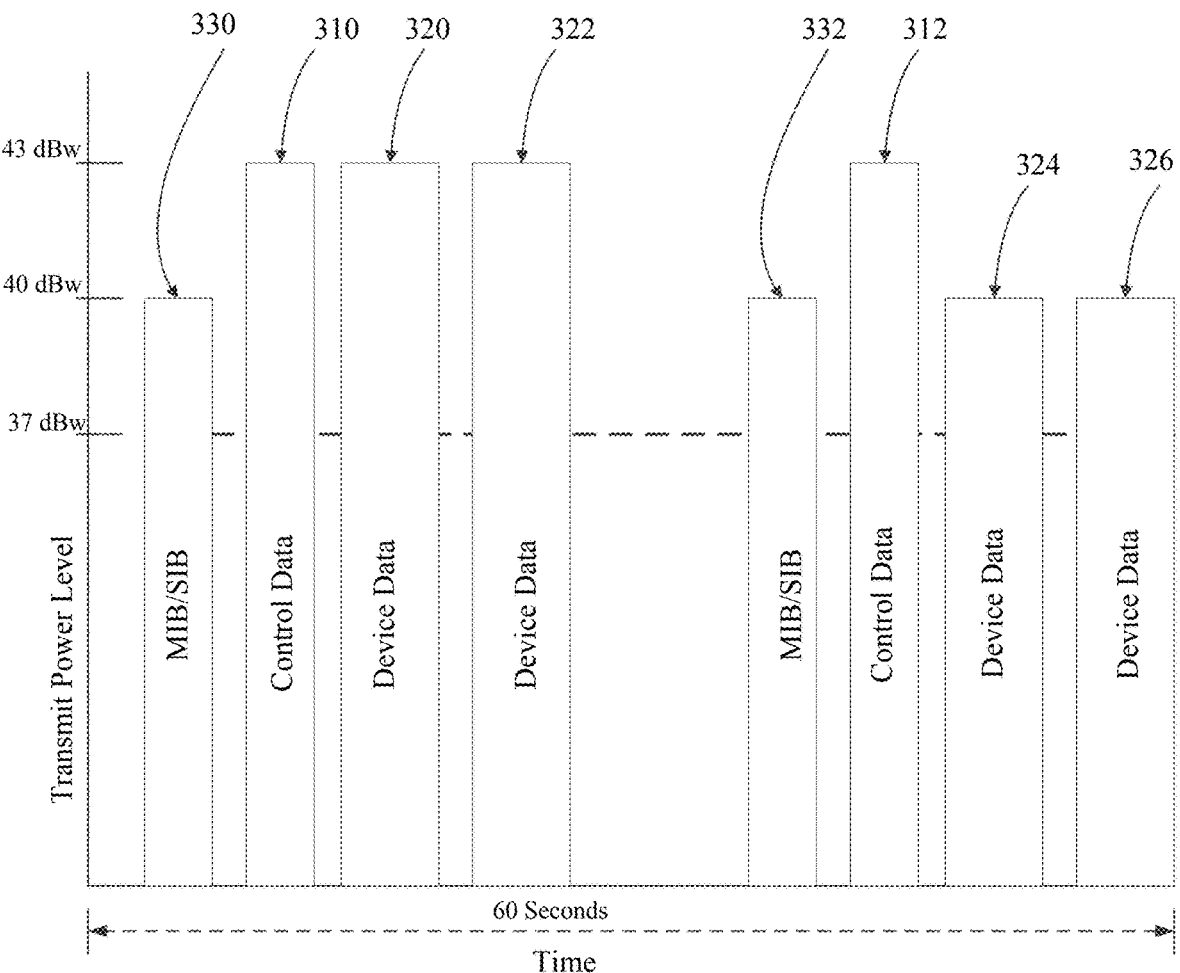
FIG. 3 shows transmission power allocations for device types of data communicated from a base station to a wireless device, according to an embodiment.

FIG. 3 shows transmission power allocations for device types of data communicated from a base station to a wireless device, according to an embodiment. As shown, the transmission power level of control data 310, 312 within a period of time (60 seconds) are boosted to a high-power level. Further, device data 320, 322 that correspond with wireless devices having a low-quality wireless link with a satellite are also transmitted with the boosted higher power level. Device data 324, 326 that correspond with wireless devices having a high-quality wireless link with a satellite are transmitted with a default power level. MIB/SIB (define) signals 330, 332 show a baseline power or default power from the base station. The MIB (Master Information Blocks) and the SIB (System Information Blocks) carry carrier information about the cell which is used by wireless devices to synchronize with the base station and to attempt to connect or attach to the base station.

Figure 4:
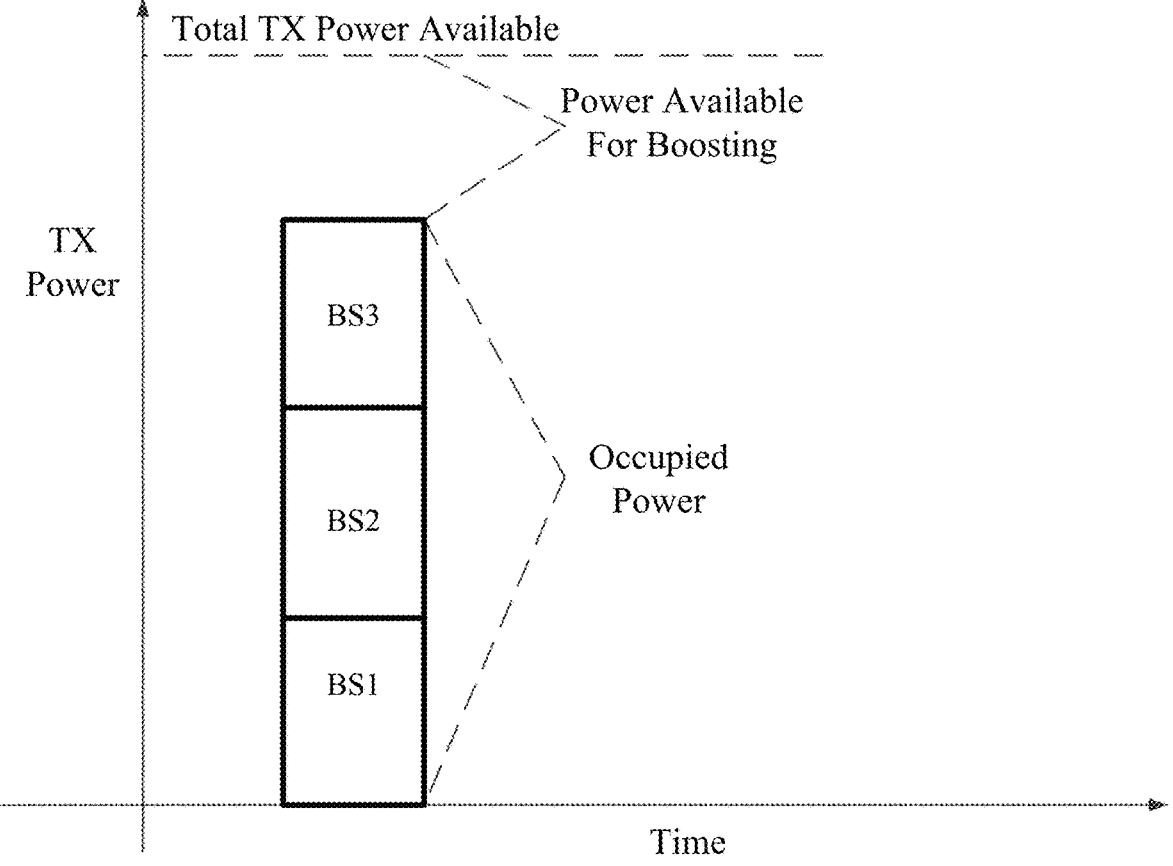
FIG. 4 shows a total available amount of power of a satellite, and an allocation of the total available amount of power to different base stations associated with the satellite, according to an embodiment.

FIG. 4 shows a total available amount of power of a satellite, and an allocation of the total available amount of power to different base stations associated with the satellite, according to an embodiment. As shown, the sum of the power consumed by the different base stations must be kept below the total available amount of power of a satellite. As shown, base stations BS1, BS2, BS3 of a satellite occupy or utilize an amount of total power. As shown, the total power being utilized is less than the total power available to the satellite associated with the base stations BS1, BS2, BS3. If the sum of the power consumed by the satellites associated with the satellite are less than the total available amount of power of the satellite, the additional boosting of control and data signals can be utilized, and/or the amount of the boosting can be increased. Accordingly, the boosted power available to the base stations BS1, BS2, BS3 can be increased.

Figure 5:
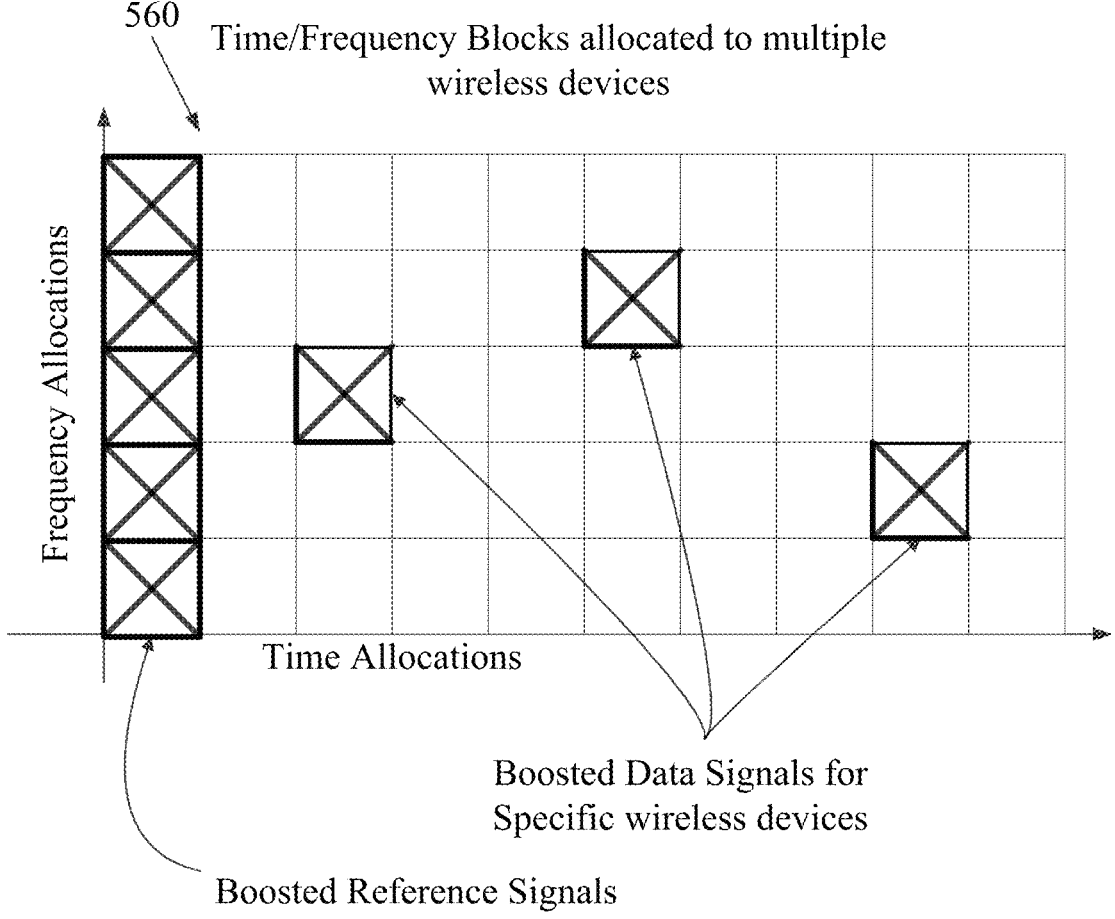
FIG. 5 shows a schedule of reference and data schedule transmission to wireless devices, according to an embodiment.

FIG. 5 shows a schedule of reference and data schedule transmission to wireless devices, according to an embodiment. The schedule 560 includes the allocation of time/frequency blocks to different of the wireless devices. The schedule 560 includes the allocation of reference signals that are transmitted at the boosted power level. Further, based on the link quality determinations of the wireless devices, boosted data signals may be allocated to specific wireless devices based on the link qualities associated with the wireless devices.

FIG. 6 is a flow chart that includes steps of a method of dynamic power assignment based on link qualities and total integrated transmission power. A first step 610 includes determining, by a base station of a satellite network, a total integrated transmission power of the base station, wherein the total integrated transmission power is integrated over time and frequency over a threshold measurement period of time, and wherein the total integrated transmission power is dependent on an available amount of power of a satellite linked to the base station. A second step 620 includes transmitting, by the base station, reference signals, wherein the reference signals are transmitted at a higher power level than data signals. A third step 630 includes receiving, by the base station, link quality characterization information from a plurality of wireless devices based on reception of the reference signals by the plurality of wireless devices through the satellite. A fourth step 640 includes assigning, by the base station, a transmission power associated with each of the plurality of wireless devices based upon the received link quality characterization information and the total integrated transmission power over the threshold period of time.

As previously described, for an embodiment, the base station determines a total integrated transmission power of the base station, wherein the total integrated transmission power is integrated over time and frequency over a threshold measurement period of time, and wherein the total integrated transmission power is dependent on an available amount of power of the satellite linked to the base station. For an embodiment, the total integrated transmission power (per base station) is defined as the total radiated power (EIRP) for all transmission by a base station over a threshold measurement period of time. For an embodiment, the threshold measurement period of time is a unit for allocation of power budgets to a base station, wherein the base station has maximum average and maximum instantaneous power limits. For an embodiment, the threshold measurement period of time depends on the satellite and an earth station. For an embodiment, the maximum average power is referred to as "maximum total integrated power", and the maximum instantaneous power is referred to as "maximum total integrated power" per base station.

For an embodiment, assigning the transmission power associated with each of the plurality of wireless devices includes assigning a default transmission power level to wireless devices having received link quality characterization information indicating a link quality better than a selected quality threshold, and assigning a boosted transmission power level to wireless devices having received link quality characterization information indicating a link quality worse than the selected quality threshold. For an embodiment, the selected link quality threshold is adaptive. For an embodiment, the selected link quality threshold is selected based on the overall demand/number of wireless devices, utilization, number of wireless devices with high service needs and low signal quality, and/or an overall power budget allocated by the satellite.

As previously described, for an embodiment, the assigning further includes assigning a Modulation and Coding Scheme (MCS) and repetitions for each of the wireless devices based on the received link quality characterization information and the calculated total integrated transmission power over the threshold period of time.

For an embodiment, the assigning includes generating a time/frequency schedule of slots of a schedule, wherein different wireless devices are assigned different slots which designate that wireless devices having poor link quality characterization information are assigned a boosted power or signal amplitude. For an embodiment, assigning the boosted power is additionally dependent on the available amount of power of a satellite. For an embodiment, the boosted power may be limited, or enhanced by an amount of available power. The amount of power available may be directed to the number of wireless devices being assigned or allocated the boosted power, and to an amount of power allocated to the boosting. For an embodiment, the total power of all of the wireless devices over the threshold period of time is less than or equal to the total integrated transmission power or the available amount of power of the satellite.

For an embodiment, the total integrated transmission power includes a maximum total integrated power per base station, and an instantaneous maximum power per base station. For an embodiment, the maximum total integrated power per base station is the maximum total power which can be transmitted by a base station over the threshold measurement period of time. For an embodiment, the instantaneous maximum power per base station is power allocated to the base station and depends upon total available power of the satellite, number of active channels on the satellite. For embodiments, the instantaneous maximum power per base station can additionally be based on RF (radio frequency) components on the satellite and ground station (amplifiers). For embodiments, the instantaneous maximum power per base station can additionally be based on Power Spectral Flux Density (PFD) on ground and non-linearity of the RF components on the Satellite and Ground Station amplifiers.

For an embodiment, the total integrated transmission power can be further divided into smaller transmission windows, wherein power levels are associated with the transmission windows. The smaller transmission windows help to provide a maximum power limit for a smaller division of time. For an embodiment, maximum power limit of each smaller transmission window is derived based on a current average power maximum, power usage of past windows, and reservation of power for future windows.

For an embodiment, by increasing the reference channel power levels alone, the overall increase in total integrated power is low. This allows for devices with very low signal quality to attempt to connect to the base station without the base station having to increase the power for all the channels which would lead to a large increase in the integrated transmission power.

An embodiment further includes a wireless device requesting to transmit signals across the satellite network based upon the estimated link quality characterization information. As previously described, for an embodiment, according to the 3GPP specifications the wireless device needs to check the minimum signal quality requirements from the base station (cell selection criteria) before trying to do a connection attempt on the particular cell. The wireless devices will only perform a connection attempt on the cell if these minimum quality requirements are met. For an embodiment, this minimum signal quality measurement on the wireless device is based on reference signal. Since the reference signal power is boosted, some wireless devices are now eligible to do a connection attempt on the cell.

As previously described, an embodiment includes adjusting, by the base station, the transmission power by adjusting a modulation constellation amplitude.

At least some embodiments further include adjusting, by the base station, the transmission power during a threshold period of time to ensure the total integrated transmission power is less than a threshold amount. As previously described, for an embodiment, each base station of the satellite network has a power budget allocated by an Integrated Power Manager (SAT), for a fixed duration of time. For an embodiment, the base station 120 is free to increase the data channel power for wireless devices as long as the total integrated transmission power of the base station 120 does not exceed the power budget allocated to the base station 120.

At least some embodiments further include assigning, by the base station, higher transmission power for the transmissions associated with a wireless device when the received link quality characterization information indicates a wireless link quality below a link quality threshold. As previously described, for an embodiment, the link quality threshold is adaptive. For an embodiment, the link quality threshold is selected based on the overall demand/number of wireless devices, utilization, number of wireless devices with high service needs and low signal quality, and/or an overall power budget allocated by the satellite.

At least some embodiments further include assigning, by the base station, higher transmission power for the transmissions associated with the wireless device when the total integrated transmission power of the base station over a threshold period of time is less than a threshold value. As previously described, for an embodiment, the base station can effectively increase the transmission power for wireless devices with higher signal quality as well if the base station has the power budget to do so, which can provide higher data rates and/or lower latency.

At least some embodiments further include assigning, by the base station, higher transmission power for the transmissions associated with a wireless device when throughput requirements require a specific modulation and encoding scheme to be used. For example, voice services may require minimum throughput for initiating a session. Therefore, a higher power is assigned to the wireless device to support the voice sessions when link quality of the wireless is poor. Similarly, higher power can be allocated for emergency services for faster response and higher reliability.

At least some embodiments further include dynamically assigning, by the base station, a receive gain amplitude for the transmissions associated with a wireless device based on the received link quality characterization information. That is, for an embodiment, the base station 120 further dynamically assigns a higher receive gain power for the transmissions associated with the wireless device with low link quality (below the selected threshold). For example, the dynamically assigned receive gain amplitude may include increasing the receiving gain for particular subcarriers transmitted to the wireless device.

For an embodiment, the wireless device provides the link quality characteristics, requested service, duration of the requested service to the base station.

For embodiment, the base station checks with a link budget manager. For an embodiment, the Link Budget Manager includes a service running on the base station or running on the cloud, and it provides a minimum MCS required to support this service and the power offset (boost) which is required to support this MCS. For an embodiment, the base station checks with its own Integrated Power Manager (base station) if the requested power offset is available already, the base station provides the power boost to the wireless device and informs the Integrated Power Manager SAT about the current used power. If the Integrated Power Manager (base station) informs the base station that the power boost requested by Link budget Manager cannot be supported, the base station now requests additional power budget allocation from the Integrated Power Manager (SAT). For an embodiment, the Integrated Power Manager (SAT) includes a service which controls the power allocation to all base stations including the base station. As depicted in FIG. 9, the Integrated Power Manager (SAT) reduces the power allocation to Base Station 2 and increases the allocation to base station 1 since base station 1 requested the power boost to support the service requested by the wireless device.

At least some embodiments further include receiving, by the base station quality of service requirements for transmissions associated with a wireless device and further assigning a transmission power to the wireless based on quality-of-service requirements. For example, if the wireless device has voice data traffic for transmission, a high data rate may be required, and therefore, and may have a minimum MCS requirement. For an embodiment, wireless devices that request voice data need to ensure they are able to sustain a minimum MCS so a higher transmission power for these wireless devices may be needed.

At least some embodiments further include collectively receiving, by the base station, the link quality characterization information from the plurality of wireless devices, and adjusting, by the base station, transmission amplitudes for all transmissions based upon the collective link quality information. As will be described in relation to FIG. 9, for an embodiment, the base station 120 has a maximum power limit (budget) allocation. For an embodiment, the base station collects link quality information from multiple wireless devices, and also the base station collects the service IDs to determine the maximum number of devices that can be assigned or allocated a power boost. As depicted in FIG. 9, the base station power boost and increase the transmission power for the data channel power for the wireless device 1 but must reduce the data channel power for wireless device 2. For an embodiment, the service IDs are services which are requested by the wireless device. For example, voice may have a service ID 1 and SMS may have a service ID2. Depending on the service ID, the MCS requirement can be different, and therefore, the link requirements change, so base station might need to increase transmission power to support some service IDs.

At least some embodiments further include monitoring, by an integrated power manager (SAT), a total integrated power levels across all base stations linked to the satellite, ensuring that a total satellite power does not exceed a maximum average power and an instantaneous power limit. For an embodiment, the power being utilized by each base station is reported by the base stations to the Integrated Power Manager (SAT).

At least some embodiments further include monitoring, by an integrated power manager (SAT), a total integrated power levels across all base stations linked to the satellite, and allocating extra power to one or more of the base stations based on network load and power requirements of the one or more base stations. as requested by the Integrated Power Manager (base station). As previously described, for an embodiment, the extra power is as requested by an integrated power manager of one or more base stations. For an embodiment, the power being utilized by each base station is reported by the base stations to the Integrated Power Manager (SAT). That is, multiple base stations linked to the satellite, but the total satellite power is maintained. For an embodiment, the total satellite power is maintained by controlling the integrated transmission of each of the base stations linked to the satellite. For an embodiment, the maximum average power is set by the satellite RF (radio frequency) components, earth station equipment limits, power availability on the satellite (most GEO Satellites are solar powered so there is a limit), and/or maximum limits set by government agencies on maximum emission on any particular frequencies to control and prevent interference. For an embodiment a maximum instantaneous power limit (instantaneous power limit) is set to reduce a total peak to average power ratio. For an embodiment, the maximum instantaneous power limit is also controlled by the satellite equipment, amplifiers, and/or ground station equipment.

For an embodiment, the satellite hosts multiple base stations and can provide multiple beams of coverage. For an embodiment, a total power availability on the satellite is limited as previously described, and the total available power needs to be shared amongst all base stations. Therefore, for an embodiment, the total integrated transmission power of the base station is directly related to satellite power limits.

For an embodiment, maximum power limits (SAT) include a maximum instantaneous and maximum average power available to the satellite to be allocated between the base stations. For an embodiment, the integrated power manager (SAT) determines these maximum power values and also the power consumptions.

For an embodiment, maximum power limits (BS) include the maximum instantaneous and max average power being allocated to each base station; these two combined can be used to determine the total integrated transmission power of the base station.

For an embodiment, a link budget manager takes multiple inputs like signal quality reported by the wireless device, the service (SMS, Voice) required by the wireless device. For an embodiment, the link budget manager determines the MCS, reptations, etc. based on these multiple inputs.

At least some embodiments further include requesting, by the base station, a new total integrated transmission power based on a service requested by the wireless device. At least some embodiments further include assigning, by the base station, higher transmission power (boosted) for the transmissions associated with the wireless devices when the extra power is allocated by the integrated power manager (SAT) for signal boost. At least some embodiments further include, assigning, by the base station, higher transmission power for the reference signals when the extra power is allocated by the integrated power manager (SAT) for signal boost.

As previously described, for an embodiment, the integrated power manager (SAT) is configured to calculate a rolling average of the power usage across multiple transmission multiple channels linked to the satellite. Further, for an embodiment, the integrated power manager (SAT) is configured to dynamically adjust the power level of at least one of the transmission channels of the base station, based on the calculated rolling average. Further, for an embodiment, the integrated power manager (SAT) is configured to assign a higher power level to a specific transmission channel as required by a specific application need, while ensuring that the combined power usage across all channels does not exceed a predetermined threshold.

FIG. 7 shows two satellite/base station architectures and management of transmission power limits, according to an embodiment. A first architecture 700 includes the satellite 110 and the base station 710 being separate units, wherein the base station 710 is located at an earth station. This embodiment can be referred to as a transparent mode of operation in non-terrestrial networks. A second architecture 701 includes the satellite 110 and the base station 790 being a single unit or the base station 790 is on the satellite. This embodiment can be referred to as a regenerative mode of operation in non-terrestrial networks. FIG. 7 shows how one satellite can support multiple beams using multiple base stations. For an embodiment, the overall maximum power limits (SAT) 730, 780 are shared amongst all base stations

751, 752, 753, 771, 772, 773 to provide maximum power limits for each of the base stations.

For an embodiment, the maximum power limit (SAT) 730, 780 includes a maximum power limit (per satellite) as controlled by the power generation capability of the satellite. For an embodiment, the maximum power limits (BS) 741, 742, 743, 761, 762, 763 include maximum power limits per base station and includes a maximum total integrated transmission power of the base station and instantaneous maximum transmission power of the base station. For an embodiment, the maximum total integrated power per base station is the maximum total power which can be transmitted by a base station over a threshold measurement period of time. For an embodiment, the instantaneous maximum transmission power which is allocated to a base station depends upon a total available power of the satellite, a number of active channels on the satellite, the RF components on the satellite and a ground station (amplifiers), a power Spectral Flux Density (PFD) on ground, and/or non-linearity of RF components on the satellite and ground station amplifiers.

Figure 8:
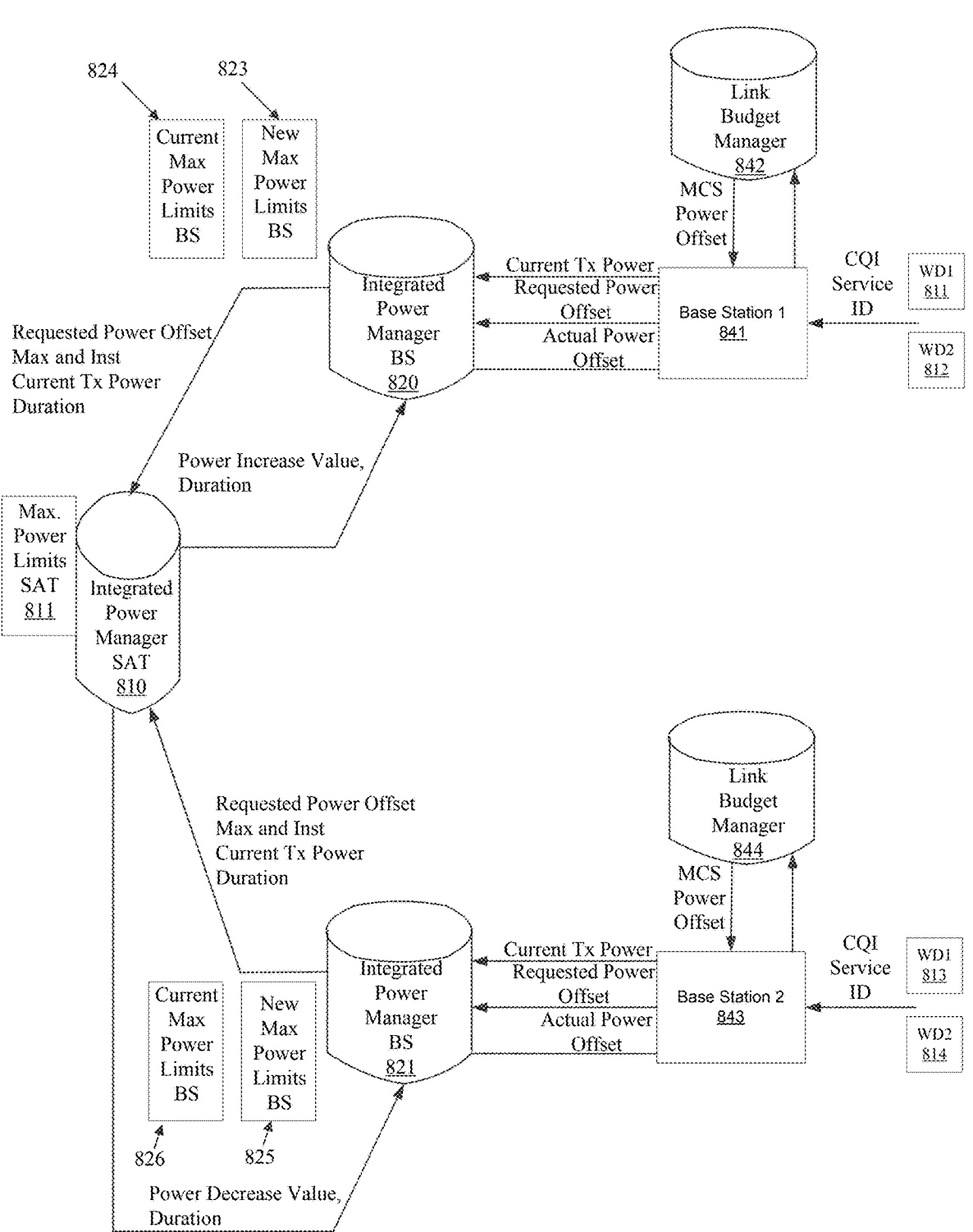
FIG. 8 shows multiple base stations of a satellite network, and the management of integrated transmission power, according to an embodiment.

FIG. 8 shows multiple base stations 841, 843 of a satellite network, and the management of integrated transmission power, according to an embodiment. FIG. 8 provides an overall flow with wireless devices 811, 812, 813, 814, the multiple base stations 841, 843, and integrated power managers 810, 820, 821. For an embodiment, the integrated power manager SAT (810) allocates maximum power limit 811 for the base stations 841, 843.

For an embodiment, WD1 811 is a wireless device which reports its channel conditions (Channel Quality Index) (CQI) and service ID (which service it wants to use) to the base station 1 841. For an embodiment, the base station 1 841 then checks with 2 different service managers (link budget manager 842 and integrated power manager BS 820). For an embodiment, the base station 1 841 obtains the CQI and service ID from the WD1 811 and computes the MCS needed for the service requested by the WD1 811. For an embodiment, along with MCS needed, the base station 1 841 also computes the power offset (boost) if any which is needed to support the MCS required.

For an embodiment, the integrated power manager BS 820 gets the current transmission power used by the base station 1 841, and the requested power offset (boost). The integrated power manager BS 820 then checks its current maximum power limits (base station) 824. If the current maximum power limit (base station) 824 is enough to meet the power offset (boost), then the integrated power manager BS 820 provides an actual power offset to base station 1 841.

If the current maximum power limit (base station) 824 is not enough to meet the power offset requested by the integrated power manager BS 820, then the integrated power manager BS 820 requests a higher maximum power limit allocation from an integrated power manager SAT 810. For an embodiment, integrated power manager BS 820 provides the requested power offset maximum and the instantaneous current transmission power along with its current Tx Power and duration of boost to the integrated power manager SAT 810.

For an embodiment, the integrated power manager SAT 810 then computes its available power budget (accessing maximum power limits SAT 811 of the satellite) and provides a power Increase value and duration to the integrated power manager BS 820. For an embodiment, the integrated power manager BS 820 then has a new maximum power limits 823 which can then be used by the base station 1 841 for meeting the service requirements.

For an embodiment, a similar process is used for controlling the power offset (boost) of the second base station 2 843. As shown, this process uses the same integrated power manager SAT 810, as the second base station 2 843 utilizes the same satellite. Further, link budget manager 844, integrated power manager 821, current maximum power limits BS 826, and new maximum power limits 825 are configured to operate like the link budget manager 842, integrated power manager 820, current maximum power limits BS 824, and new maximum power limits 823.

The main objective is to increase the network efficiency and at the same time provide a reliable connectivity service to the devices. In the absence of the integrated power manager SAT 810, a constant power is allocated to the base stations 841, 843. However, the power used by base stations 841, 843 depends upon the usage. For example, if the coverage area of a base station includes the ocean, then the total integrated transmit power used by this base station will be much lower than the other base stations. For an embodiment, the integrated power manager SAT 810 obtains regular usage feedback from the base stations and based on that allocates higher power limits for the base stations which need it the most.

For an embodiment, the integrated power manager 820 provides power boost to the base stations based on the total used integrated power and maximum power limits allocated for the base station. In the absence of the integrated power manager 820, the base station may not be able to use unutilized power to boost the signal for the wireless devices having weaker links. For an embodiment, the integrated power manager 820 keeps track of the power and based on the tracked power provides boost power for the devices.

FIG. 9 shows management of a distribution of integrated transmission power of a base station 900, according to an embodiment. As described, the base station 900 receives link qualities (CQI) and service request IDs from wireless devices 911, 912 through a satellite link (not shown). Using an integrated power manager 952, a link budget manager 942, and an integrated power manager SAT 910, the base station determines whether to boost at least some data channel transmissions to the wireless devices 911, 912. As shown, the data channel transmission to the wireless device 912 may be boosted (high power), and the data channel transmission to the wireless device 911 may not be boosted (low power).

For an embodiment, the base station 900 checks with the link budget manager 942 which is a service running native to the base station or on cloud, and it provides the minimum MCS required to supports the requested service and the power offset (boost) which is required to support this MCS. For an embodiment, the base station 900 then checks with its own integrated power manager (base station) 952 if the requested power offset is available. If the requested power offset is available, the base station 900 provides the power boost to the wireless device and informs the integrated power manager SAT 910 about the current used power.

For an embodiment, if the integrated power manager 952 (base station) informs the base station 900 that the power boost requested by link budget manager 942 cannot be supported, the base station 900 then requests for additional power budget allocation from the integrated power manager SAT 910.

For an embodiment, the integrated power manager SAT 910 includes a service which controls the power allocation to all base stations. While shown in FIG. 9 as a part of the base station 900, generally the integrated power manager SAT 910 is separate from the base station 900.

Figure 10:
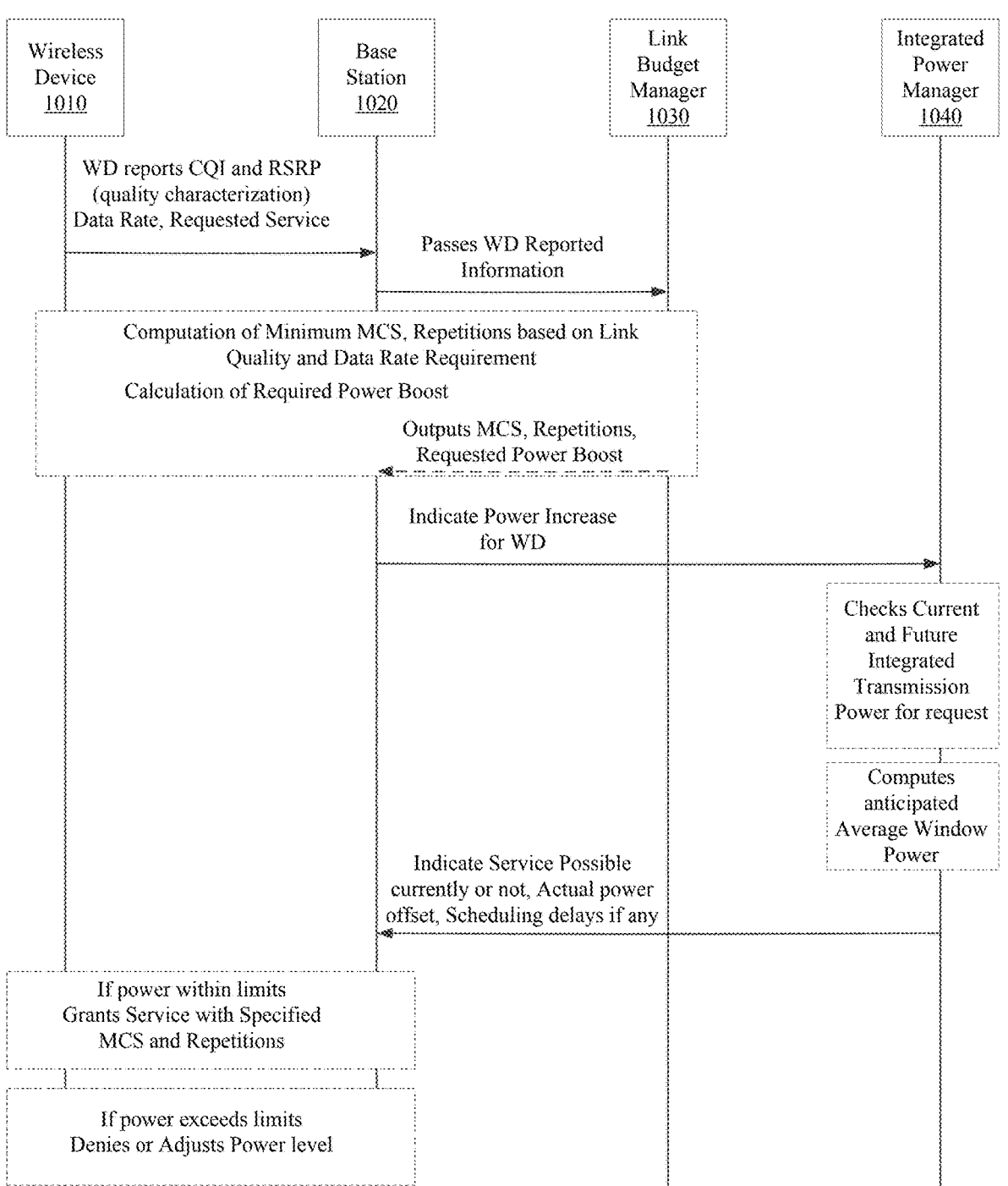
FIG. 10 shows a timeline of events between a wireless device, a base station, a link budget manager, and an integrated power manager, according to an embodiment.

FIG. 10 shows a timeline of events between a wireless device 1010, a base station 1020, a link budget manager 1030, and an integrated power manager 1040, according to an embodiment. As shown, the wireless device 1010 reports link quality characteristics and requests service types. The base station 1020 receives this information and passes the information of the wireless device on to the link budget manager 1030.

For an embodiment, the base station 1020 along with the link budget manager computes a minimum MCS and repetitions based on the link qualities and the data rate requirements. For an embodiment, the link budget manager 1020 provides the output MCS, repetitions, and requested power boost to the base station 1020.

For an embodiment, the base station communicates the power increase (power boost of data signals) to the integrated power manager 1040. For an embodiment, the integrated power manager 1040 then checks current and future integrated power transmission for request and computes an anticipated average window power. For an embodiment, the integrated power manager 1040 indicates to the base station whether the requested service is possible currently or not, the power offset (boost), and scheduling delays (indicating the service may be possible in the future).

For an embodiment, if the power request of the base station 1020 is within the limits of the integrated power manager 1040, then the requested service is granted along with a specified MCS and repetitions. If the requested power exceeds the limits, the requested power is denied and the power level may be adjusted.

Figure 11:
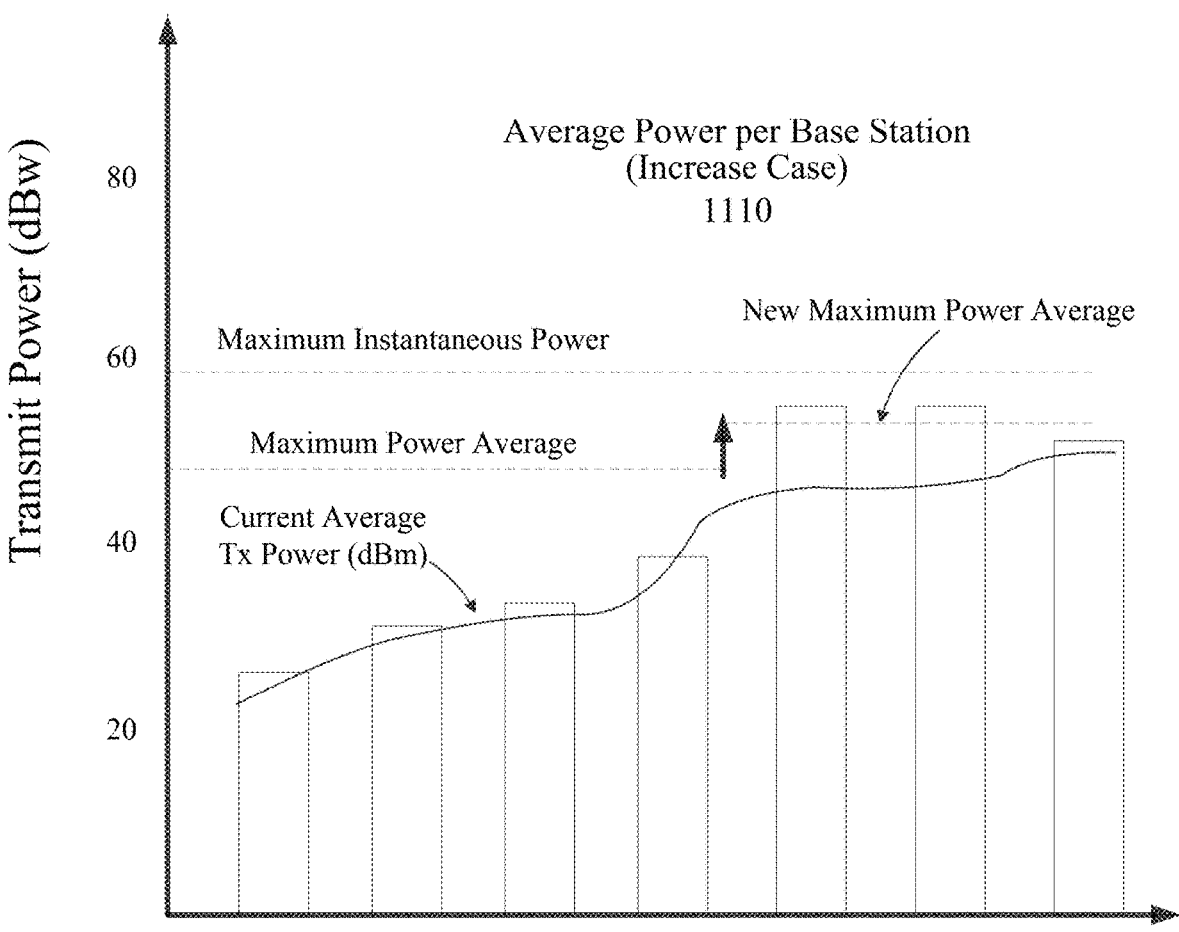
FIG. 11 shows transmission power management per base station, according to an embodiment.

FIG. 11 shows transmission power management per base station, according to an embodiment. Specifically, FIG. 11 shows maximum power limits 1110 for one base station. As shown, the maximum instantaneous power limits are changed. Further, as shown, the maximum average power limits are changed to a new maximum power average based on requirements. Further, as depicted, the actual average power level of the base station is always within the maximum average limits. Further, instantaneous power increases over the maximum power average limits but never over the maximum instantaneous power limits.

Figure 12:
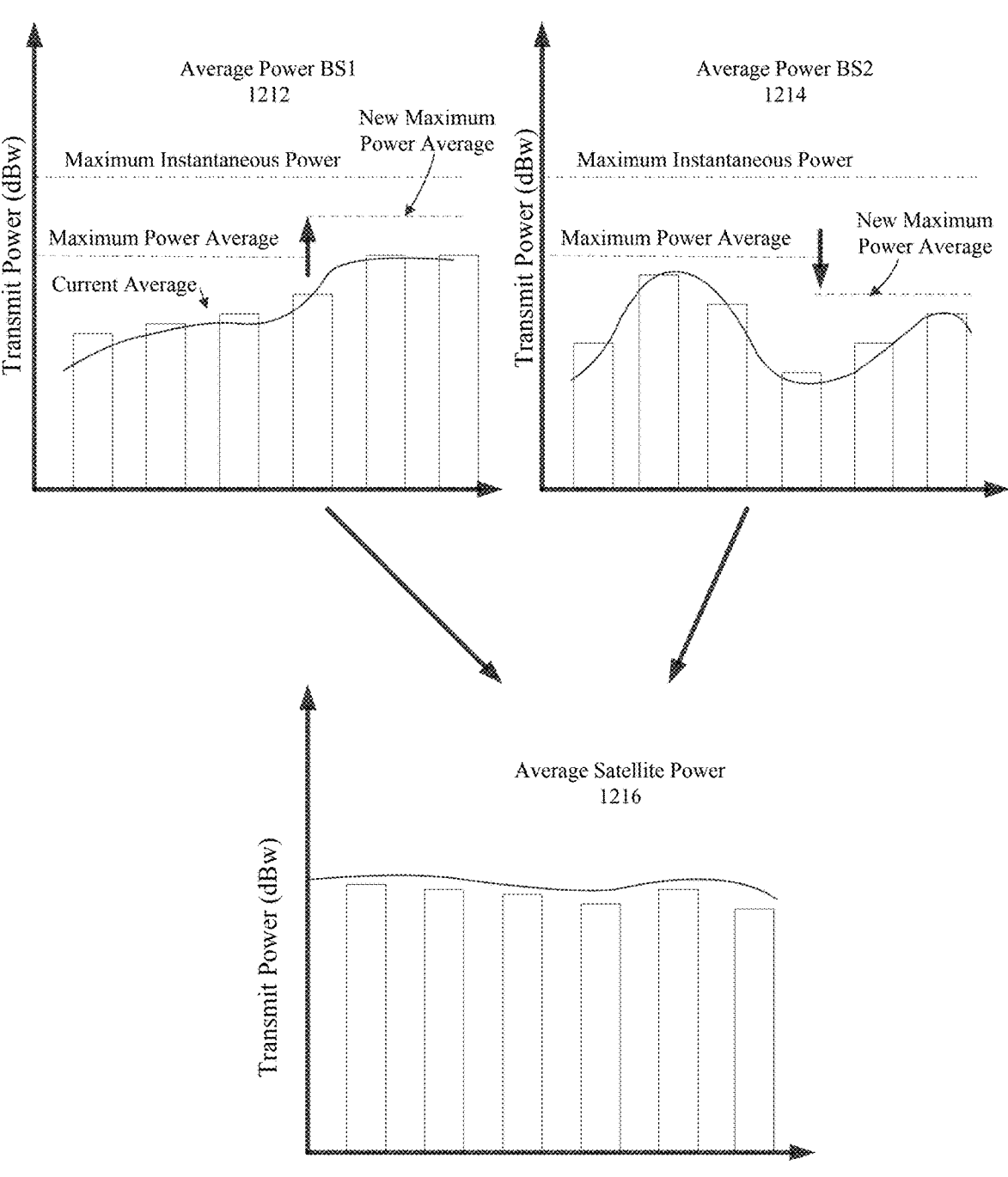
FIG. 12 shows an average power allocation per satellite, according to an embodiment.

FIG. 12 shows an average power allocation per satellite, according to an embodiment. For an embodiment, FIG. 12 is an extension of FIG. 11, and shows the interworking between maximum power limits between different base stations. As shown, the average power 1212 of base station BS1 has a power increase, while the average power 1214 of the base station BS2 decreases. The average power 1212 and the average power 1214 combine as the average satellite power 1216.

Although specific embodiments have been described and illustrated, the embodiments are not to be limited to the specific forms or arrangements of parts so described and illustrated. The described embodiments are to only be limited by the claims.

What is claimed:

1. A method, comprising:
   determining, by a base station of a satellite network, a total integrated transmission power of the base station, wherein the total integrated transmission power is integrated over time and frequency over a threshold measurement period of time, and wherein the total integrated transmission power is dependent on an available amount of power of a satellite linked to the base station;

transmitting, by the base station, reference signals, wherein the reference signals are transmitted at a higher power level than data signals;
   receiving, by the base station, link quality characterization information from a plurality of wireless devices based on reception of the reference signals by the plurality of wireless devices through the satellite; and
   assigning, by the base station, a transmission power associated with each of the plurality of wireless devices based upon the received link quality characterization information and the total integrated transmission power over the threshold period of time.

2. The method of claim 1, wherein assigning the transmission power associated with each of the plurality of wireless devices comprises:
   assigning a default transmission power level to wireless devices having received link quality characterization information indicating a link quality better than a selected quality threshold; and
   assigning a boosted transmission power level to wireless devices having received link quality characterization information indicating a link quality worse than the selected quality threshold.

3. The method of claim 2, further comprising a wireless device requesting to transmit signals across the satellite network based upon the estimated link quality characterization information.

4. The method of claim 1, further comprising adjusting, by the base station, the transmission power during a threshold period of time to ensure the total integrated transmission power is less than a threshold amount.

5. The method of claim 1, further comprising, assigning, by the base station, higher transmission power for the transmissions associated with a wireless device when the received link quality characterization information indicates a wireless link quality below a link quality threshold.

6. The method of claim 1, further comprising, assigning, by the base station, higher transmission power for the transmissions associated with the wireless device when the total integrated transmission power of the base station over a threshold period of time is less than a threshold value.

7. The method of claim 1, further comprising, assigning, by the base station, higher transmission power for the transmissions associated with a wireless device when throughput requirements require a specific modulation and encoding scheme to be used.

8. The method of claim 1, further comprising dynamically assigning, by the base station, a receive gain amplitude for the transmissions associated with a wireless device based on the received link quality characterization information.

9. The method of claim 1, further comprising receiving, by the base station quality of service requirements for transmissions associated with a wireless device and further assigning a transmission power to the wireless based on quality-of-service requirements.

10. The method of claim 1, further comprising, collectively receiving, by the base station, the link quality characterization information from the plurality of wireless devices, and adjusting, by the base station, transmission amplitudes for all transmissions based upon the collective link quality information.

11. The method of claim 1, where the change in transmission power is based upon the transmission power level of the reference signals.

12. The method of claim 1, further comprising monitoring, by an integrated power manager (SAT), a total integrated power levels across all base stations linked to the satellite, ensuring that a total satellite power does not exceed a maximum average power and an instantaneous power limit.

13. The method of claim 1, further comprising:

monitoring, by an integrated power manager (SAT), a total integrated power levels across all base stations linked to the satellite; and allocating extra power to one or more of the base stations based on network load and power requirements of the one or more base stations.

14. The method of claim 1, further comprising:

requesting, by the base station, a new total integrated transmission power based on a service requested by a wireless device.

15. A satellite system base station configured to:

determine a total integrated transmission power of the satellite base station, wherein the total integrated transmission power is integrated over time and frequency over a threshold measurement period of time, and wherein the total integrated transmission power is dependent on an available amount of power of a satellite linked to the satellite base station;

transmit reference signals, wherein the reference signals are transmitted at a higher power level than data signals;

receive link quality characterization information from a plurality of wireless devices based on reception of the reference signals by the plurality of wireless devices through the satellite; and assign a transmission power associated with each of the plurality of wireless devices based upon the received link quality characterization information and the total integrated transmission power over the threshold period of time.

16. The satellite system base station of claim 15, wherein satellite system base station configured to assign the transmission power associated with each of the plurality of wireless devices comprises the satellite system base station further configured to:

assign a default transmission power level to wireless devices having received link quality characterization information indicating a link quality better than a selected quality threshold; and assign a boosted transmission power level to wireless devices having received link quality characterization information indicating a link quality worse than the selected quality threshold.

17. The satellite system base station of claim 15, wherein the satellite system base station is further configured to adjust the transmission power during a threshold period of time to ensure the total integrated transmission power is less than a threshold amount.

18. The satellite system base station of claim 15, wherein the satellite system base station is further configured to assign higher transmission power for the transmissions associated with the wireless device when the total integrated transmission power of the satellite system base station over a threshold period of time is less than a threshold value.

19. The satellite system base station of claim 15, further comprising an integrated power manager (SAT) configured to monitor a total integrated power levels across all base stations linked to the satellite, ensuring that a total satellite power does not exceed a maximum average power and an instantaneous power limit.

20. The satellite system base station of claim 15, wherein an integrated power manager (SAT) is configured to:

monitor a total integrated power levels across all base stations linked to the satellite; and allocate extra power to one or more of the base stations based on network load and power requirements of the one or more base stations.

* * * * *